(12) United States Patent
Du et al.

(10) Patent No.: US 12,321,369 B2
(45) Date of Patent: Jun. 3, 2025

(54) MANAGEMENT METHOD AND DEVICE FOR HAZARDOUS CHEMICALS, AND A CONSTRUCTION METHOD FOR A MANAGEMENT DATABASE

(71) Applicant: EAST CHINA UNIVERSITY OF SCIENCE AND TECHNOLOGY, Shanghai (CN)

(72) Inventors: Wenli Du, Shanghai (CN); Yang Tang, Shanghai (CN); Bing Wang, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 18/556,618

(22) PCT Filed: Mar. 30, 2022

(86) PCT No.: PCT/CN2022/083981
§ 371 (c)(1),
(2) Date: Apr. 16, 2024

(87) PCT Pub. No.: WO2022/222717
PCT Pub. Date: Oct. 27, 2022

(65) Prior Publication Data
US 2024/0296174 A1    Sep. 5, 2024

(30) Foreign Application Priority Data
Apr. 21, 2021 (CN) .......................... 202110429844.8

(51) Int. Cl.
*G06F 16/28* (2019.01)
(52) U.S. Cl.
CPC .......... *G06F 16/285* (2019.01); *G06F 16/288* (2019.01)

(58) Field of Classification Search
CPC ............ G06F 16/2428; G06F 16/2445; G06F 16/24573; G06F 16/248
See application file for complete search history.

(56) References Cited

U.S. PATENT DOCUMENTS

| | | | | |
|---|---|---|---|---|
| 2002/0194201 | A1* | 12/2002 | Wilbanks | G16B 50/20 707/999.107 |
| 2008/0154749 | A1* | 6/2008 | D'hooghe | G06Q 50/26 705/28 |

(Continued)

FOREIGN PATENT DOCUMENTS

| | | |
|---|---|---|
| CN | 107749041 A | 3/2018 |
| CN | 111339214 A | 6/2020 |
| CN | 112948509 A | 6/2021 |

OTHER PUBLICATIONS

First Office Action issued for Chinese Patent Application No. 202110429844.8, dated Jun. 30, 2023, 15 pages including English machine translation.

(Continued)

*Primary Examiner* — Yuk Ting Choi
(74) *Attorney, Agent, or Firm* — HSML P.C.

(57) ABSTRACT

The present invention relates to a management method and a device for hazardous chemicals and a construction method of a management database. The construction method comprises following steps: determining a plurality of entities involved in entire lifecycle of hazardous chemicals; classifying the plurality of entities to define a plurality of entity classes involved in the management database; defining a plurality of relationship classes according to one or more relationships involved between every two of the entity classes; using the relationship from one or more of the relationship classes to constrain the relationships between every two entities, so as to construct an ontology of the database; and importing actual data of the hazardous chemi- (Continued)

cals throughout their entire lifecycle into the ontology, so as to carry out instantiation of the ontology. By implementing this construction method, a management database for hazardous chemicals can be obtained, which can break the island phenomenon of multi-field data by integrating and fusing the multi-filed data throughout the entire lifecycle of hazardous chemicals, thereby achieving the effects of reasonable resource allocation, dynamic warning and supervision, and emergency linkage.

12 Claims, 3 Drawing Sheets

(56) References Cited

U.S. PATENT DOCUMENTS

| | | | |
|---|---|---|---|
| 2011/0238610 A1 | 9/2011 | Lee et al. | |
| 2017/0116306 A1* | 4/2017 | Kapoor | G06F 16/211 |
| | | | 707/737 |
| 2018/0075379 A1* | 3/2018 | Menezes | G06Q 10/0635 |
| | | | 707/737 |
| 2018/0114190 A1* | 4/2018 | Borrel | G06N 20/00 |
| | | | 707/737 |
| 2018/0173795 A1* | 6/2018 | Cobbett | G06F 16/316 |
| | | | 707/737 |
| 2023/0236587 A1* | 7/2023 | Yang | G05B 19/4184 |
| | | | 702/185 |

OTHER PUBLICATIONS

Xulei, W. et al., "How to truly improve the safety management of hazardous chemicals in China—Analysis based on big data of hazardous chemical accidents," Exploration and Free Views, 2016, pp. 73-77 (16 pages including English machine translation).

International Search Report issued for International Patent Application No. PCT/CN2022/083981, Date of mailing: Jun. 13, 2022, 5 pages including English translation.

* cited by examiner

MANAGEMENT METHOD AND DEVICE FOR HAZARDOUS CHEMICALS, AND A CONSTRUCTION METHOD FOR A MANAGEMENT DATABASE

TECHNICAL FIELD

The disclosure relates to the technical field of information integration and combination, in particular to a construction method for a hazardous chemical management database, a computer-readable storage medium storing the hazardous chemical management database, a management method for hazardous chemicals based on the hazardous chemical management database, and a management device for hazardous chemicals based on the hazardous chemical management database.

BACKGROUND

In recent years, with the increasing development of the national economy, the demand for chemical products and the requirements for product quality in various important fields, such as agriculture, industry and service industry, have been constantly increasing, accelerating the development of the chemical industry and the emergence of chemical enterprises. The chemical industry, as an important pillar industry in the national economy, involves a large variety of hazardous chemicals with complex chemical characteristics. In order to create a good environment, government department attach great importance to the supervision of hazardous chemicals and the management of enterprises, and have introduced a series of laws, regulations and policies to constrain them.

However, hazardous chemicals generally have problems such as long life cycle spans, high resource risk, broad scope of involvement, diverse data form and difficulty in forming rules, requiring collaborative supervision from a plurality of departments. This collaborative supervision model by the plurality of departments results in a diverse and dispersed management system for hazardous chemicals, lacking comprehensive application of hazardous chemical data. At the same time, the ownership of rights and responsibilities among various regulatory departments is also relatively dispersed, and there is a lack of unified coordination mechanism among regulatory departments, moreover, there is overlap in business, which can easily lead to a series of problems such as resource waste. Therefore, this decentralized regulatory model generally suffers from inadequate management and supervision, which can easily lead to a large number of chemical reaction accidents, transportation accidents and other chemical accidents, thereby causing extremely serious impacts on people's lives and the environment.

In order to overcome the above shortcomings of existing technologies, there is an urgent need for a management technology for hazardous chemicals in this field, which can break the island phenomenon of multi-field data by integrating and fusing the multi-filed data throughout the entire lifecycle of hazardous chemicals, thereby achieving the effects of reasonable resource allocation, dynamic warning and supervision, as well as emergency linkage.

SUMMARY

A brief overview of one or more aspects is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to overcome the above shortcomings of the existing technology, the disclosure provides a construction method for a hazardous chemical management database, a computer-readable storage medium storing the hazardous chemical management database, a management method for hazardous chemicals based on the hazardous chemical management database, and a management device for hazardous chemicals based on the hazardous chemical management database, which can break the island phenomenon of multi-field data by integrating and fusing the multi-filed data throughout the entire lifecycle of hazardous chemicals, thereby achieving the effects of reasonable resource allocation, dynamic warning and supervision, as well as emergency linkage.

The construction method for a hazardous chemical management database according to the first aspect of the disclosure, comprises following steps: determining a plurality of entities involved in entire lifecycle of hazardous chemicals; classifying the plurality of entities to define a plurality of entity classes involved in the management database; defining a plurality of relationship classes according to one or more relationships involved between every two of the entity classes; using the relationship from one or more of the relationship classes to constrain the relationships between every two entities, so as to construct an ontology of the database; and importing actual data of the hazardous chemicals throughout their entire lifecycle into the ontology, so as to carry out instantiating of the ontology. The management database can break the island phenomenon of multi-field data by integrating and fusing the multi-filed data throughout the entire lifecycle of hazardous chemicals. Those skilled in the art can achieve the effects of reasonable resource allocation, dynamic warning and supervision, as well as emergency linkage.

Preferably, in some embodiments of the disclosure, steps of determining a plurality of entities involved in entire lifecycle of hazardous chemicals comprise: determining a plurality of stages involved in the entire lifecycle of the hazardous chemicals; determining a plurality of fields involved in each of the stages of the hazardous chemicals; and determining a plurality of entities involved in each of the fields of the hazardous chemicals.

Preferably, in some embodiments of the disclosure, steps of classifying the plurality of entities to define a plurality of entity classes involved in the management database comprise: analyzing all entities in each field of each stage of the hazardous chemicals throughout its entire lifecycle to determine a logical common point among the entities; and grouping the entities according to the common point to establish the plurality of entity classes and one or more entity subclasses under each of the entity class.

Preferably, in some embodiments of the disclosure, the entire lifecycle of the hazardous chemicals comprises six stages including "production", "storage", "transportation", "trade", "use" and "disposal", and the management database comprises five entity classes including "personnel", "abstract object", "activity", "organization" and "resource", wherein the entity class of "abstract object" comprises entity subclasses of "safety risk" and "law and regulation", the entity class of "activity" comprises entity subclasses of "chemical accident" and "chemical reaction", the entity class of "organization" comprises entity subclasses of "chemical enterprise" and "government department", and the entity class of "resource" comprises entity subclasses of "chemical product", "storage container" and "transportation tool".

Optionally, in some embodiments of the disclosure, steps of defining a plurality of relationship classes according to one or more relationships involved between every two of the entity classes comprise: determining a plurality of entity classes involved in each stage of the hazardous chemicals throughout its entire lifecycle; determining one or more relationships between every two of the entity classes involved in the same stage; and defining the corresponding relationship class according to each of the relationships.

Preferably, in some embodiments of the disclosure, the steps of defining a plurality of relationship classes according to one or more relationships involved between every two of the entity classes also comprise: carrying out attribute constraining to the corresponding relationship classes respectively, according to definition domain and/or value range corresponding to each of the relationships.

Preferably, in some embodiments of the disclosure, the steps of defining a plurality of relationship classes according to one or more relationships involved between every two of the entity classes also comprise: grouping the plurality of relationship classes according to logical common points of the plurality of defined relationship classes, and determining one or more relationship subclasses under each group of the relationship classes.

Preferably, in some embodiments of the disclosure, the management database comprises three groups of relationship classes including "event", "human resource" and "government", wherein the relationship class of "event" comprises relationship subclasses of "related subject", "related personnel", "related substances", "injuries" and "deaths", the relationship class of "human resource" comprises relationship subclasses of "engaging in", "operating", "belonging to" and "driving", and the relationship class of "government" comprises relationship subclasses of "management object", "issuing", "involved in handling", "law enforcement personnel" and "inspection object".

Optionally, in some embodiments of the disclosure, steps of using the relationship from one or more of the relationship classes to constrain the relationships between every two entities comprise: determining a plurality of entities involved in each stage of the hazardous chemicals throughout its entire lifecycle; and selecting a relationship from the relationship class or the relationship subclass with matching attribute constraint, according to the entity classes of every two entities in the same stage, to connect the two entities, so as to obtain a plurality of data that conform to a (S, P, O) triplet structure.

Preferably, in some embodiments of the disclosure, steps of importing actual data of the hazardous chemicals throughout their entire lifecycle into the ontology comprise: carrying out data mapping to the actual data according to the plurality of entity classes and the plurality of relationship classes involved in the management database, to extract entity data and relationship data thereof; and combining each of the entity data and its corresponding relationship data according to the (S, P, O) triplet structure, to obtain a plurality of instantiated data that conform to the (S, P, O) triplet structure.

Preferably, in some embodiments of the disclosure, the steps of importing actual data of the hazardous chemicals throughout their entire lifecycle into the ontology further comprise: substituting the actual data of a plurality of the hazardous chemicals throughout their entire lifecycle into the ontology respectively, to construct the management database for the plurality of hazardous chemicals.

The computer-readable storage medium, according to the second aspect of the disclosure, stores the hazardous chemical management database constructed by the construction method according to the first aspect of the disclosure. This management database can break the island phenomenon of multi domain data by integrating and combining multi domain data throughout the entire lifecycle of hazardous chemicals. Those skilled in the art can use this management database to achieve the effects of reasonable resource allocation, dynamic warning and supervision, as well as emergency linkage.

The management method for hazardous chemicals, according to the third aspect of the disclosure, uses the hazardous chemical management database constructed by the construction method according to the first aspect of the disclosure to manage the hazardous chemicals. Therefore, this management method can break the island phenomenon of multi-field data by integrating and fusing the multi-filed data throughout the entire lifecycle of hazardous chemicals, thereby achieving the effects of reasonable resource allocation, dynamic warning and supervision, as well as emergency linkage.

The management device for hazardous chemicals according to the fourth aspect of the disclosure comprises a memory and a processor. The processor is connected to the memory, and configured to implement the management method for hazardous chemicals according to the third aspect of the disclosure. Therefore, the management device for hazardous chemicals can break the island phenomenon of multi-field data by integrating and fusing the multi-filed data throughout the entire lifecycle of hazardous chemicals, thereby achieving the effects of reasonable resource allocation, dynamic warning and supervision, as well as emergency linkage.

BRIEF DESCRIPTION OF THE DRAWINGS

The above features and advantages of the present invention will be better understood after reading the detailed description of the embodiments of the present disclosure in conjunction with the following figures. In the figures, components are not necessarily drawn to scale, and components having similar related features may have the same or similar reference numerals.

REFERENCE SIGNS

Figure 1:
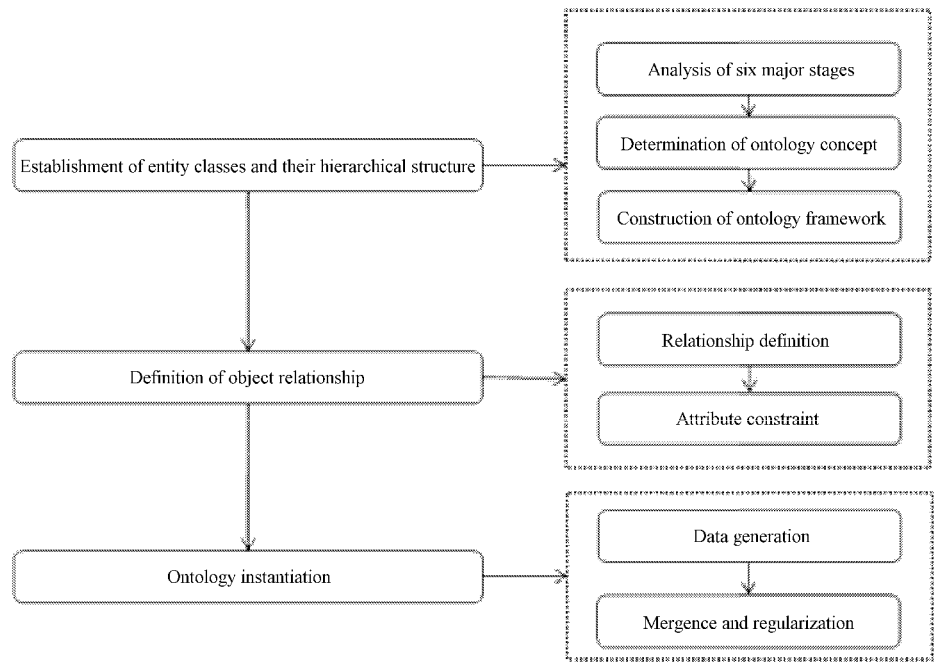
FIG. 1 shows a flowchart of the construction method of a hazardous chemical management database according to some embodiments of the disclosure.

S1: personnel;
S2: abstract object;
S21: safety risk;

S22: law and regulation;
S3: activity;
S4: resource;
S5: organization;
S51: chemical enterprise;
S52: government department;
R1: event;
R11: related subject;
R12: related personnel;
R13: related substances;
R14: deaths;
R15: injuries;
R2: human source;
R21: engaging in;
R22: operating;
R23: belonging to;
R24: driving;
R3: government;
R31: management object;
R32: issuing;
R33: involved in handling;
R34: law enforcement personnel;
R35: inspection object

DETAILED DESCRIPTION OF EMBODIMENTS

The implementations of the present invention are described below by specific embodiments. Those skilled in the art can easily understand other advantages and effects of the present invention from the contents disclosed in the description. Although the description of the present invention is introduced together with preferred embodiments, it does not mean that the features of the present invention are limited to the embodiments. On the contrary, the purpose of introducing the present invention in combination with the embodiments is to cover other options or modifications that may be extended based on the claims of the present invention. In order to provide a deep understanding of the present invention, the following description will contain many specific details. The present invention can also be implemented without using these details. In addition, in order to avoid confusion or ambiguity of the key points of the present invention, some specific details is omitted in the description.

In the description of the disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. For those skilled in the art, the specific meaning of the above terms in the present invention can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present invention.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present invention.

As mentioned above, the lifecycle span of hazardous chemicals is long, and usually regulated by a plurality of departments, resulting in multiple and scattered information systems, a lack of comprehensive application of data, decentralized powers and responsibilities among the plurality of departments, a lack of unified coordination mechanisms among the plurality of regulatory departments, and overlap in business, which can easily lead to a series of problems such as resource waste.

In order to overcome the above shortcomings of existing technologies, the disclosure provides a multi-field ontology construction approach based on the entire lifecycle of hazardous chemicals, which helps to break the island phenomenon of data in multi-fields, reasonably arrange resources and integrate full chain perception, so that those skilled in the art in the chemical industry can perform dynamically early warning, supervision and emergency linkage of hazardous chemicals based on the constructed management database, thereby achieving the goal of "one network unified management" in the management and control of hazardous chemicals.

Specifically, this disclosure provides a construction method for a hazardous chemical management database, a computer-readable storage medium storing the hazardous chemical management database, a management method for hazardous chemicals based on the hazardous chemical management database, and a management device for hazardous chemicals based on the hazardous chemical management database.

Please refer to FIG. 1, FIG. 1 shows a flowchart of the construction method of a hazardous chemical management database according to some embodiments of the disclosure.

As shown in FIG. 1, in some embodiments of the disclosure, the above construction method of the hazardous chemical management database mainly comprises the steps: (1) establishing entity classes and their hierarchical structure, (2) defining object relationships, and (3) instantiating ontology, wherein:

(1) the step of establishing entity classes and their hierarchical structure is mainly used to determine the entities in all fields and involved in each stage, based on the analysis of a plurality of stages throughout the entire lifecycle of hazardous chemicals, and classify these entities according to logical rules to define a plurality of entity classes involved in managing the database;

(2) the step of defining object relationships is mainly used to analyze all possible relationships between the entity classes, and define a plurality of relationship classes involved in the management database according to these relationships and the attributes of their two corresponding entity classes;

(3) the step of instantiating ontology is mainly used to integrate the actual data of hazardous chemicals with the constructed ontology concepts, so as to obtain a hazardous chemical management database that is mutually unified at the data and conceptual levels.

In some embodiments, the entire lifecycle of hazardous chemicals may comprise six stages including "production", "storage", "transportation", "trade", "use" and "disposal". Those skilled in the art may analyze all possible situations in different fields in each stage one by one, list the functions and rules of each situation in each stage, then analyze the characteristics of all important concepts in each situation and classify them into groups, and finally build an ontology framework to form a clear hierarchical structure of entity classes.

Specifically, the first stage in the entire lifecycle of hazardous chemicals is the "production" stage. In this first stage, a plurality of important concepts belonging to different fields, such as "hazardous process", "chemical reaction", "hazardous chemical property", "enterprise management", "major hazard source" and "emergency management", are mainly involved. The second stage of the entire lifecycle of hazardous chemicals is the "storage" stage, which is used to load the produced hazardous chemical in a specific container and store it in a suitable environment. The second stage may mainly involve important concepts such as "chemical process" and "special equipment". The third stage of the entire lifecycle of hazardous chemicals is the "transportation" stage, which is used to transport the produced hazardous chemical to a required enterprise. The third stage may mainly involve important concepts such as "transportation tool", "driver", "waybill", "enterprise" and "supervision of government department (such as public securities and transportation departments)". The fourth and fifth stages of the entire lifecycle of hazardous chemicals are the "trade" and "use" stages, which mainly involve important concepts such as "chemical reaction", "chemical property" and "major hazard source". The sixth stage of the entire lifecycle of hazardous chemicals is the "disposal" stage, which may mainly involve important concepts such as "management of the ecological department".

Furthermore, in some embodiments, the six stages mentioned above will be further constrained by relevant laws and regulations, and have certain safety risks, requiring the reserve of emergency resources to respond to emergencies. Therefore, these stages may further involve important concepts such as "resource".

After analyzing the various basic situations of the above six major stages, those skilled in the art can list all important concepts involved in each stage by the fields. For example, for the embodiments involving the above six major stages, the six major stages of the entire lifecycle of hazardous chemicals mainly involve important concepts, such as "chemical accident", "chemical reaction", "law and regulation", "safety risk", "chemical enterprise", "government department", etc, which belong to a plurality of different fields.

Afterwards, those skilled in the art can perform feature analysis on all of the listed important concepts to determine their commonalities in logical rules, and then group and classify these important concepts according to the commonalities in these logical rules to define a plurality of entity classes involved in the management database. At this point, these important concepts are entities that belong to the corresponding entity class.

For example, due to the needs of personnel involvement in the above six major stages of "production", "storage", "transportation", "trade", "use" and "disposal", the disclosure can classify "personnel" as an individual entity class according to the logical commonalities. For important concepts such as law and regulation, as well as security risk, the disclosure can classify them as an "abstract object" entity class according to the logical commonalities. For all events (e.g. chemical accident and chemical reaction) in the six major stages mentioned above, the disclosure can uniformly classify them as an "activity" entity class according to the logical commonalities. For government regulatory departments and related enterprises, the disclosure can uniformly classify them as an "organization" entity class according to the logical commonalities. For important concepts, such as chemicals produced by the chemical enterprise, storage container involved in the "storage" stage and transportation tool involved in the "transportation" stage, the disclosure can uniformly classify them as a "resource" entity class according to the logical commonalities. Thus, those skilled in the art may divide the plurality of important concepts of the six major stages in various fields into five or more entity classes, such as S1 (personnel), S2 (abstract object), S3 (activity), S4 (resource) and S5 (organization), according to logical rules.

Furthermore, in some embodiments, for various important concepts belonging to different fields involved in each entity class, those skilled in the art may establish a plurality of subclasses of secondary entities under each entity class according to the actual situation. Please refer to FIG. 2, FIG. 2 shows an architectural schematic diagram of a plurality of entity classes involved in the management database according to some embodiments of the disclosure.

Figure 2:
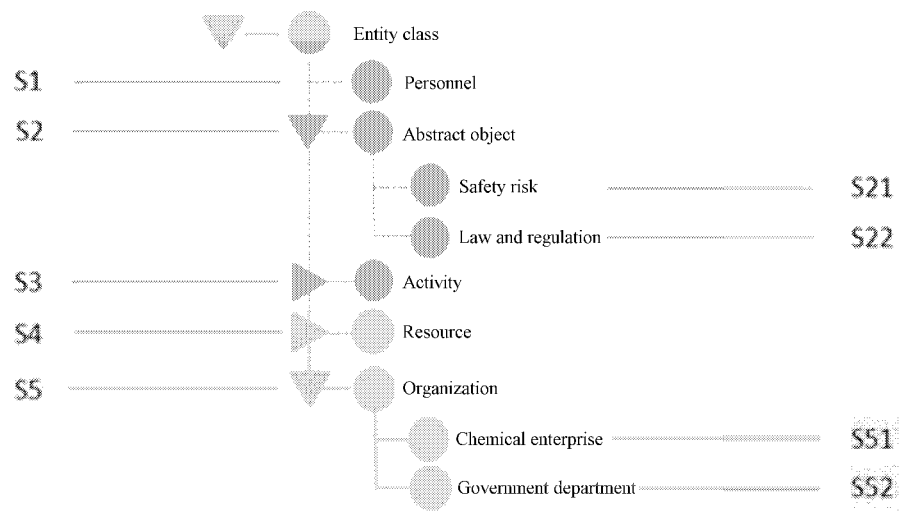
FIG. 2 shows an architectural schematic diagram of a plurality of entity classes involved in the management database according to some embodiments of the disclosure.

In the embodiment shown in FIG. 2, the secondary entity subclass may not be set under S1 (personnel) entity class. A plurality of secondary entity subclasses such as S21 (security risk) and S22 (law and regulation) may be further set under the S2 (abstract object) entity class. A plurality of secondary entity subclasses such as S31 (chemical accident) and S32 (chemical reaction) may be further set under the S3 (activity) entity class. A plurality of secondary entity subclasses such as S41 (chemical product), S42 (storage container) and S43 (transportation tool) may be further set under the S4 (resource) entity class. A plurality of secondary entity subclasses such as S51 (chemical enterprise) and S52 (government department) may be further established under the S5 (organization) entity class.

In this way, the disclosure can analyze the important concepts in various fields, involved in each stage of the entire lifecycle of hazardous chemicals, establish a plurality of entity classes of the hazardous chemical management database, and construct a hierarchical structure of each entity class and its subordinate secondary entity subclasses, thereby expanding the knowledge structure centered on hazardous chemicals and coordinated with a plurality of fields.

Those skilled in the art can understand that although the above embodiments describe the subject performing the steps of establishing entity classes and their hierarchical structure as skilled in the art, this does not limit the scope of protection of the disclosure. Optionally, in other embodiments, the steps of establishing entity classes and their hierarchical structure, defining object relationships, and instantiating ontology can also be automatically implemented by a processor according to pre written computer instructions.

As shown in FIG. 1, after completing the steps of establishing entity classes and their hierarchical structure, five entity classes, such as S1 (personnel), S2 (abstract object), S3 (activity), S4 (resource) and S5 (organization), and a plurality of secondary entity subclasses under them can be determined. Due to the possibility of a plurality of associations between the plurality of entity classes and secondary entity subclasses that rely on the presence of hazardous chemicals in practical situations, the disclosure further connects each entity class and each secondary entity subclass by defining object relationships, to describe the complex connections between each entity class and each secondary entity subclass, thereby achieving the goal of interlocking and intelligent linkage.

Specifically, the first step in adding object relationships can be relationship definition. Those skilled in the art may first determine the plurality of entity classes and/or secondary entity subclasses involved in each of the six stages of the entire lifecycle of hazardous chemicals as the research basis. Afterwards, those skilled in the art may analyze the possible relationships between each entity class and each secondary entity subclass in each stage one by one. Afterwards, those skilled in the art may list the possible relationships between each two classes and/or subclasses, and classify these relationships according to the logical commonalities to define corresponding relationship classes. Furthermore, in some embodiments, for the plurality of relationships belonging to different categories, involved in each relationship class, those skilled in the art may also establish a plurality of secondary relationship subclasses under each relationship class according to the actual situation.

It can be understood that compared to directly defining relationship classes according to the relationships that may arise between all entity classes and all secondary entity subclasses involved in the entire lifecycle of hazardous chemicals, the disclosure defines relationship classes by analyzing the relationships that may arise between each entity class and its subordinate secondary entity subclasses in each stage one by one. This method can eliminate a large number of the potential useless relationships between entity classes belonging to different stages, thereby effectively simplifying the data structure involved in the hazardous chemical management database.

Figure 3:
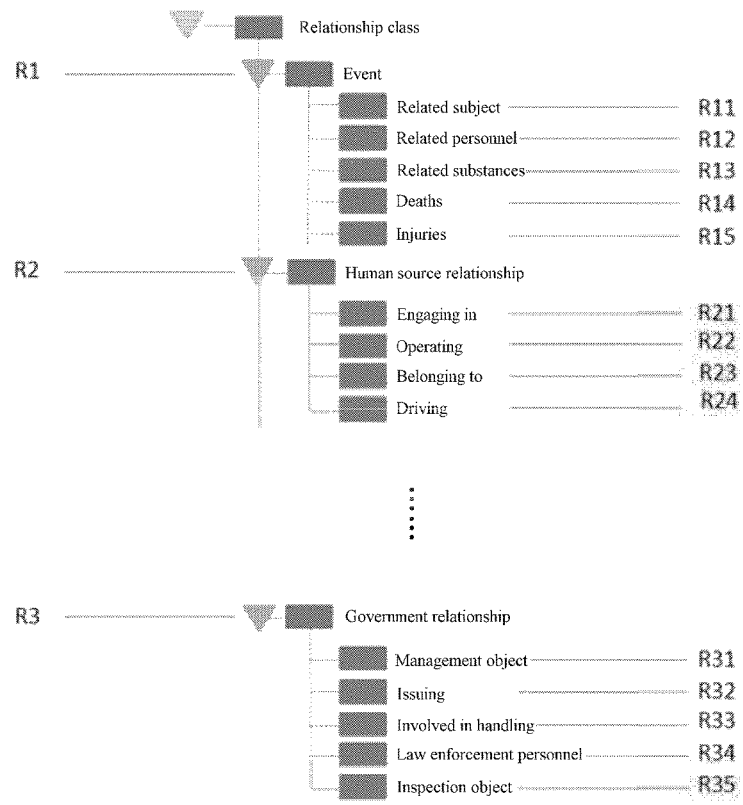
FIG. 3 shows an architectural schematic diagram of a plurality of relationship classes involved in the management database according to some embodiments of the disclosure.

Please refer to FIG. 3 for the embodiments involving the six major stages. FIG. 3 shows an architectural schematic diagram of a plurality of relationship classes involved in the management database according to some embodiments of the disclosure.

In the embodiment shown in FIG. 3, those skilled in the art may first define three or more relationship classes, such as R1 (event), R2 (human source) and R3 (government), according to the six entity classes S1-S5 involved in the entire lifecycle of hazardous chemicals, as well as the possible relationships between each secondary entity subclass.

Furthermore, for the specific relationships belonging to different categories, involved in each relationship class R1-R3, those skilled in the art may establish a plurality of secondary relationship subclasses under each relationship class R1-R3 according to the actual situation. For example, a plurality of secondary relationship subclasses, such as R11 (related subject), R12 (related personnel), R13 (related substances), R14 (deaths) and R15 (injuries), may be further set under the relationship class of R1 (event). A plurality of secondary relationship subclasses, such as R21 (engaging in), R22 (operating), R23 (belonging to) and R24 (driving), may be further set under the relationship class of R2 (human source). A plurality of secondary relationship subclasses, such as R31 (management object), R32 (issuing), R33 (involved in handling), R34 (law enforcement personnel) and R35 (inspection object), may be further established under the relationship class of R3 (government relationship).

After completing the definition of each relationship class R1-R3 and its subordinate relationship subclasses, those skilled in the art may further impose attribute constraints on the defined relationship classes R1-R3 and their subordinate relationship subclasses, to indicate the attributes of the subject and object connected by each relationship class R1-R3 and its subordinate relationship subclasses.

In some embodiments, those skilled in the art may use the Domain and Range descriptions provided by RDFS in the ontology development tool "protégé", to indicate the definition domain and value range of the subject and object connected by various relationship classes R1-R3 and their subordinate relationship subclasses. It can be understood that the ontology development tool "protégé" is a Java language based ontology editing and knowledge acquisition software, developed by Stanford University. This software provides the construction functions of classes, relationships and attributes in ontology concepts, and the instances input function. It can be edited based on a graphical interface, avoiding direct writing of low-level description code. RDF (i.e. subject-predicate-object) is a resource description framework that expresses information to the World Wide Web and can be used to describe web resources. The above RDF Schema (referred as RDFS) is a descriptive dictionary that provides a data model for RDF data.

Specifically, the above description term Domains is used to define the entity class or collection of entity classes that has a source entity with a certain attribute, while the above description term Ranges is used to limit the value range of the object (which may be an entity or a data type) that is restricted by a certain attribute.

For example, regarding the second level entity subclasses S52 (government department) and S22 (law and regulation) involved in the third stage of the entire lifecycle of hazardous chemicals, the disclosure uses the second level relationship subclass R32 (issuing) to describe the relationship between these two second level entity subclasses S52 and S22. Correspondingly, the second level relationship subclass R32 (issuing) should be constrained by the descriptive term Domains to connect the relationship attributes of the subject belonging to the second level entity subclass S52 (government department) and the object belonging to the second level entity subclass S22 (law and regulation).

For another example, regarding the second level entity subclasses S31 (chemical accident) and the entity class S1 (personnel) involved in the first stage of the entire lifecycle of hazardous chemicals, the relationship between the second level entity subclasses S31 and the entity class S1 (personnel) should be respectively described by the second level relationship subclasses R12 (related personnel), R14 (deaths) and R15 (injuries). Correspondingly, the second level relationship subclass R12 (related personnel) should be constrained by the descriptive term Domains to connect the relationship attributes of the subject belonging to the second level entity subclass S31 (chemical accident) and the object belonging to the entity class S1 (personnel), as well as be constrained by the descriptive term Ranges to connect the value domain attributes of the object belonging to a value range. Similarly, the second level relationship subclass R14 (deaths) should also be constrained by the descriptive term Domains to connect the relationship attributes of the subject belonging to the second level entity subclass S31 (chemical accident) and the object belonging to the entity class S1 (personnel), as well as be constrained by the descriptive term Ranges to connect the value domain attributes of the object belonging to a value range. The second level relationship subclass R15 (injuries) should also be constrained by the descriptive term Domains to connect the relationship attributes of the subject belonging to the second level entity subclass S31 (chemical accident) and the object belonging to the entity class S1 (personnel), as well as be constrained by the descriptive term Ranges to connect the value domain attributes of the object belonging to a value range.

After completing the definitions and attribute constraints of each relationship class R1-R3 and its subordinate relationship subclasses, those skilled in the art may first determine the plurality of entities involved in each stage of the entire lifecycle of hazardous chemicals. Then, the relationships in the relationship classes R1-R3 or the relationship subclasses that match the attribute constraints may be selected to connect two entities, according to the definition domain and/or value range of each two of the entity classes in the same stage, to obtain a plurality of pieces of data that conform to the structure of (S, P, O). It can be understood that the form of (S, P, O) above is also known as the SPO triplet structure, which is a way of representing knowledge. In some embodiments, the S may represent the first entity, and the O may represent the second entity. At this point, the P may represent the relationship attribute between the first entity and the second entity. In other embodiments, the S may represent the first entity, while the O may represent the corresponding attribute values (such as value range). At this point, the P may represent the value domain attribute of the first entity.

Figure 4:
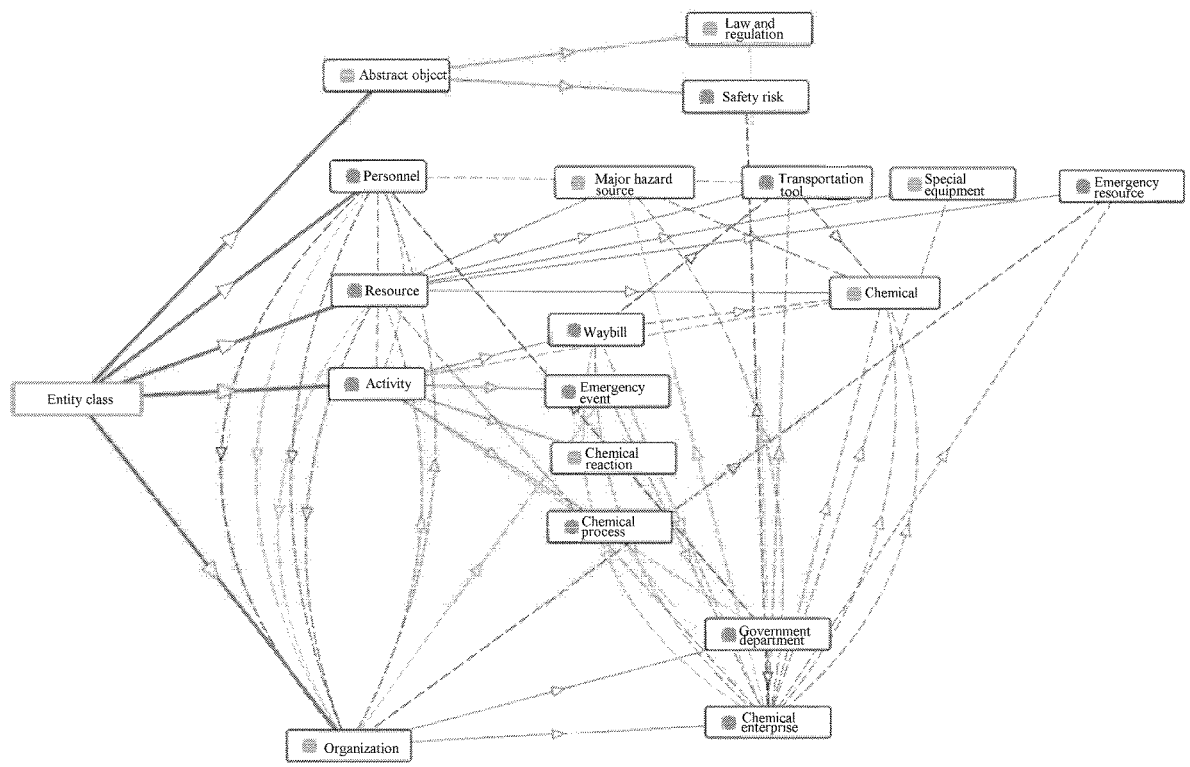
FIG. 4 shows a schematic diagram of data structure of the database ontology according to some embodiments of the disclosure.

Please refer to FIG. 4, FIG. 4 shows a schematic diagram of data structure of the database ontology according to some embodiments of the disclosure.

As shown in FIG. 4, by using the above (S, P, O) form to combine the plurality of entities involved in the entire lifecycle of hazardous chemicals into a plurality of SPO structured data, the ontology of the hazardous chemicals management database can be constructed. In FIG. 4, the solid line with an arrow represents the hierarchical structure between each entity class and its subordinate secondary entity subclasses, while the dashed line with an arrow between each entity class and its secondary entity subclasses represents the relationship between the two. In this way, the ontology constructed based on the above method can not only describe the types and structural levels of multi-filed entity data involved in the entire lifecycle of hazardous chemicals, but also describe the complex connections between multi-filed data in a unified form. Therefore, it helps to break the data silos to achieve interconnection and interoperability at the data and entity levels, thereby achieving the goal of interlocking and intelligent linkage.

As shown in FIG. 1, after completing the construction of the database ontology, those skilled in the art may import the actual data of one or more hazardous chemicals in various stages of their entire lifecycle into the ontology to instantiate the database ontology, thereby achieving consistency between the data and conceptual levels.

Figure 5:
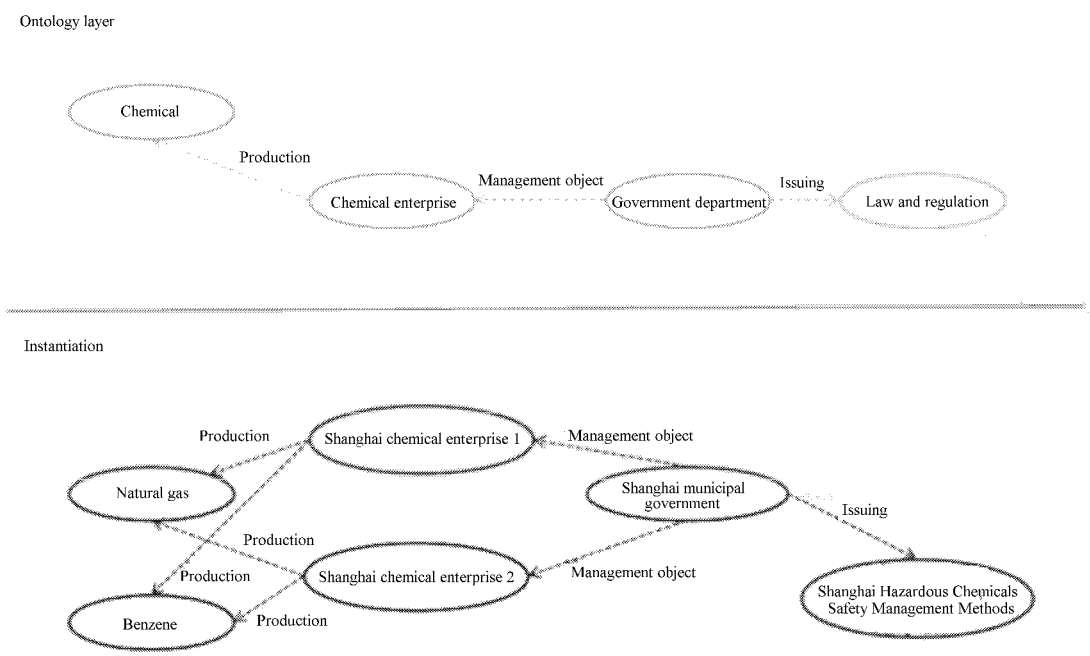
FIG. 5 shows a schematic diagram of ontology instantiation according to some embodiments of the disclosure.

Please refer to FIG. 5, FIG. 5 shows a schematic diagram of ontology instantiation according to some embodiments of the disclosure.

As shown in FIG. 5, for the actual data involved in various stages of the entire lifecycle of natural gas, those skilled in the art may first map the actual data of natural gas, according to the plurality of entity classes S1-S5 and the plurality of relationship classes R1-R3 involved in the management database, to extract the entity data (e.g. natural gas, shanghai chemical enterprise 1, Shanghai Municipal Government and "Shanghai Hazardous Chemicals Safety Management Methods") and the relationship data (e.g. production, management, issuing, etc.). Afterwards, those skilled in the art may generate the RDF (subject predicate object) triplet structure according to the rules of the entity classes S1~S5 and the relationship classes R1~R3 defined in the ontology, wherein R (subject) and F (object) correspond to the entity classes S1~S5 defined in the ontology, and D (predicate) corresponds to the relationship classes R1~R3 defined in the ontology.

For example, in some embodiments, for the actual data involved in the entire lifecycle of the natural gas above, those skilled in the art may generate a RDF triplet of "shanghai chemical enterprise 1-production-natural gas" according to the SPO data structure of (chemical enterprise, production, chemicals); they may also generate a RDF triplet of "shanghai municipal government-management—shanghai chemical enterprise 1" according to the SPO data structure of (government department, management object, chemical enterprise); they may also generate a RDF triplet of "shanghai municipal government-issuing-shanghai hazardous chemicals safety management methods" according to the SPO data structure of (government department, issuing, law and regulation).

Optionally, in other embodiments, for the actual data involved in the entire lifecycle of benzene shown in FIG. 5, those skilled in the art may generate a RDF triplet of "shanghai chemical enterprise 2-production-benzene" according to the SPO data structure of (chemical enterprise, production, chemicals); they may also generate a RDF triplet of "shanghai municipal government-management-shanghai chemical enterprise 2" according to the SPO data structure of (government department, management object, chemical enterprise); they may also generate a RDF triplet "shanghai municipal government-issuing-shanghai hazardous chemicals safety management methods" according to the SPO data structure of (government department, issuing, law and regulation).

Afterwards, those skilled in the art may import the RDF triplet data generated by the various mappings into the hazardous chemicals management database, according to the W3C standard paradigm, to obtain a plurality of instantiation data that conform to the SPO data structure above, thereby achieving ontology instantiation.

In this way, by importing the actual data of various hazardous chemicals, such as natural gas and benzene, throughout their entire lifecycle into the ontology for instantiation, a management database for various hazardous chemicals, such as natural gas and benzene, can be obtained. This management database can effectively solve the combination problem between multi-source heterogeneous data in the entire lifecycle of hazardous chemicals, and provide a top-level framework for orderly integration of data, providing preliminary rule support for subsequent applications.

In some embodiments of the disclosure, the management database of the hazardous chemicals may be stored on various computer-readable storage media, such as hard drives and cloud servers. Suppliers of the management database may provide users with the management database of the hazardous chemicals by selling, renting, licensing the use of the computer-readable storage media, etc., for the management of the hazardous chemicals.

In some embodiments of the disclosure, those skilled in the art may use a management device for hazardous chemicals to use the above hazardous chemicals management database. Specifically, the management device for hazardous chemicals may comprise a memory and a processor. The memory comprises but is not limited to the computer-readable storage media for the management database containing hazardous chemicals above. The processor can be connected to the memory and configured to implement a hazardous chemicals management method to utilize the hazardous chemical management database above to manage hazardous chemicals.

By using the management database for hazardous chemicals above, supervision personnel of hazardous chemicals and those skilled in the art belonging to various stages of the chemical industry can collaborate on the management, dynamic warning and supervision, and emergency linkage of hazardous chemicals at various execution ends of "production", "storage", "transportation", "trade", "use" and "disposal", thereby achieving the goal of ensuring chemical safety and breaking the island phenomenon of multi-field data.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein, but can be understood by those skilled in the art.

Those skilled in the art will understand that information, signals and data can be represented by using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

Those skilled in the art will further appreciate that various illustrative logic blocks, modules, circuits and algorithm steps described in combination with the embodiments disclosed herein can be implemented as electronic hardware, computer software or a combination of both. In order to clearly explain the interchangeability of hardware and software, various illustrative components, blocks, modules, circuits and steps are generally described above in the form of their functionality. Whether such functionality is implemented as hardware or software depends on the specific application and design constraints imposed on the overall system. Technicians can implement the described functionality in different ways for each specific application, but such implementation decisions should not be interpreted as leading to departure from the scope of the disclosure.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, a plurality of microprocessors, one or more microprocessors cooperating with the DSP core or any other such configuration.

The previous description of the disclosure is provided to enable any person skilled in the art to make or use the disclosure. Various modifications to the disclosure will be apparent to those skilled in the art, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

The invention claimed is:

1. A construction method for a hazardous chemical management database, comprising following steps:
   determining a plurality of entities involved in a plurality of fields that are involved in a plurality of stages throughout entire lifecycle of hazardous chemicals, and classifying the plurality of entities to define a plurality of entity classes involved in the management database;
   respectively determining a plurality of entity classes involved in each stage of the hazardous chemicals throughout its entire lifecycle, and determining one or more relationships between every two of the entity classes involved in the same stage;
   respectively defining corresponding relationship class according to each of the relationships;
   using the relationship from one or more of the relationship classes to constrain the relationships between every two entities, so as to construct an ontology of the database; and
   importing actual data of the hazardous chemicals throughout their entire lifecycle into the ontology, so as to carry out instantiating of the ontology,
   wherein the entire lifecycle of the hazardous chemicals comprises six stages including "production", "storage", "transportation", "trade", "use", and "disposal", and the management database comprises five entity classes including "personnel", "abstract object", "activity", "organization", and "resource", and
   wherein using the relationship from one or more of the relationship classes to constrain the relationships between every two entities, so as to construct an ontology of the database includes:
      using the relationship from one or more of the relationship classes to connect every two entities, and using a Domain description and a Range description provided by a Resource Description Framework Schema (RDFS) in an ontology development tool named protégé, to constrain a definition domain and a value range between the two entities, so as to construct the ontology of the database.

2. The construction method according to claim 1, wherein steps of classifying the plurality of entities to define a plurality of entity classes involved in the management database comprise:
   analyzing all entities in each field of each stage of the hazardous chemicals throughout its entire lifecycle to determine a logical common point among the entities; and
   grouping the entities according to the common point to establish the plurality of entity classes and one or more entity subclasses under each of the entity class.

3. The construction method according to claim 2, wherein the entity class of "abstract object" comprises entity subclasses of "safety risk" and "law and regulation", the entity class of "activity" comprises entity subclasses of "chemical accident" and "chemical reaction", the entity class of "organization" comprises entity subclasses of "chemical enterprise" and "government department", and the entity class of "resource" comprises entity subclasses of "chemical product", "storage container" and "transportation tool".

4. The construction method according to claim 1, further comprising following step:
   carrying out attribute constraining to the corresponding relationship classes respectively, according to definition domain and/or value range corresponding to each of the relationships.

5. The construction method according to claim 4, further comprising following step:
   grouping the plurality of relationship classes according to logical common points of the plurality of defined relationship classes, and determining one or more relationship subclasses under each group of the relationship classes.

6. The construction method according to claim 5, wherein the management database comprises three groups of relationship classes including "event", "human resource" and "government", wherein the relationship class of "event" comprises relationship subclasses of "related subject", "related personnel", "related substances", "injuries" and "deaths", the relationship class of "human resource" comprises relationship subclasses of "engaging in", "operating", "belonging to" and "driving", and the relationship class of "government" comprises relationship subclasses of "management object", "issuing", "involved in handling", "law enforcement personnel" and "inspection object".

7. The construction method according to claim 4, wherein steps of using the relationship from one or more of the relationship classes to constrain the relationships between every two entities comprise:
   determining a plurality of entities involved in each stage of the hazardous chemicals throughout its entire lifecycle; and
   selecting a relationship from the relationship class or the relationship subclass with matching attribute constraint, according to the entity classes of every two entities in the same stage, to connect the two entities, so as to obtain a plurality of data that conform to a triplet structure.

8. The construction method according to claim 7, wherein steps of importing actual data of the hazardous chemicals throughout their entire lifecycle into the ontology comprise:
   carrying out data mapping to the actual data according to the plurality of entity classes and the plurality of relationship classes involved in the management database, to extract entity data and relationship data thereof; and
   combining each of the entity data and its corresponding relationship data according to the triplet structure, to obtain a plurality of instantiated data that conform to the triplet structure.

9. The construction method according to claim 8, wherein steps of importing actual data of the hazardous chemicals throughout their entire lifecycle into the ontology further comprise:
   substituting the actual data of a plurality of the hazardous chemicals throughout their entire lifecycle into the ontology respectively, to construct the management database for the plurality of hazardous chemicals.

10. A management method for hazardous chemicals, using the hazardous chemical management database, constructed by the construction method according to claim 1, to manage the hazardous chemicals.

11. A non-transitory computer-readable storage medium, wherein the computer-readable storage medium stores a hazardous chemical management database constructed by performing the following steps:
    determining a plurality of entities involved in a plurality of fields that are involved in a plurality of stages throughout entire lifecycle of hazardous chemicals, and classifying the plurality of entities to define a plurality of entity classes involved in the management database;
    respectively determining a plurality of entity classes involved in each stage of the hazardous chemicals throughout its entire lifecycle, and determining one or more relationships between every two of the entity classes involved in the same stage;
    respectively defining corresponding relationship class according to each of the relationships;
    using the relationship from one or more of the relationship classes to constrain the relationships between every two entities, so as to construct an ontology of the database; and
    importing actual data of the hazardous chemicals throughout their entire lifecycle into the ontology, so as to carry out instantiating of the ontology,
    wherein the entire lifecycle of the hazardous chemicals comprises six stages including "production", "storage", "transportation", "trade", "use", and "disposal", and the management database comprises five entity classes including "personnel", "abstract object", "activity", "organization", and "resource", and
    wherein using the relationship from one or more of the relationship classes to constrain the relationships between every two entities, so as to construct an ontology of the database includes:
      using the relationship from one or more of the relationship classes to connect every two entities, and using a Domain description and a Range description provided by a Resource Description Framework Schema (RDFS) in an ontology development tool named protégé, to constrain a definition domain and a value range between the two entities, so as to construct the ontology of the database.

12. A management device for hazardous chemicals, comprises:
    a memory; and
    a processor, connected to the memory and configured to implement a management method for hazardous chemicals that comprises:
    determining a plurality of entities involved in a plurality of fields that are involved in a plurality of stages throughout entire lifecycle of hazardous chemicals, and classifying the plurality of entities to define a plurality of entity classes involved in a management database;
    respectively determining a plurality of entity classes involved in each stage of the hazardous chemicals throughout its entire lifecycle, and determining one or more relationships between every two of the entity classes involved in the same stage;
    respectively defining corresponding relationship class according to each of the relationships;
    using the relationship from one or more of the relationship classes to constrain the relationships between every two entities, so as to construct an ontology of the database; and
    importing actual data of the hazardous chemicals throughout their entire lifecycle into the ontology, so as to carry out instantiating of the ontology,
    wherein the entire lifecycle of the hazardous chemicals comprises six stages including "production", "storage", "transportation", "trade", "use", and "disposal", and the management database comprises five entity classes including "personnel", "abstract object", "activity", "organization", and "resource", and
    wherein using the relationship from one or more of the relationship classes to constrain the relationships between every two entities, so as to construct an ontology of the database includes:
      using the relationship from one or more of the relationship classes to connect every two entities, and using a Domain description and a Range description provided by a Resource Description Framework Schema (RDFS) in an ontology development tool named protégé, to constrain a definition domain and a value range between the two entities, so as to construct the ontology of the database.

\* \* \* \* \*